US012801335B2

(12) United States Patent
Porta et al.

(10) Patent No.: US 12,801,335 B2
(45) Date of Patent: Nov. 17, 2026

(54) AUDIO SYSTEM

(71) Applicant: RCF S.P.A., Reggio Nell'Emilia (IT)

(72) Inventors: Giordano Porta, Guastalla (IT); Umberto Zanghieri, Rome (IT)

(73) Assignee: RCF S.P.A., Reggio Nell'emilia (IT)

( * ) Notice: Subject to any disclaimer, the term of this patent is extended or adjusted under 35 U.S.C. 154(b) by 151 days.

(21) Appl. No.: 18/971,424

(22) Filed: Dec. 6, 2024

(65) Prior Publication Data

US 2025/0370700 A1 Dec. 4, 2025

(30) Foreign Application Priority Data

Jun. 4, 2024 (IT) ........................ 102024000012727

(51) Int. Cl.

| | |
|---|---|
| ***G06F 3/16*** | (2006.01) |
| ***G08C 23/04*** | (2006.01) |
| ***H04B 5/79*** | (2024.01) |
| ***H04R 3/12*** | (2006.01) |

(52) U.S. Cl.
CPC .............. *G06F 3/162* (2013.01); *G06F 3/165* (2013.01); *G08C 23/04* (2013.01); *H04B 5/79* (2024.01); *H04R 3/12* (2013.01); *H04R 2420/07* (2013.01)

(58) Field of Classification Search
CPC ......... G06F 3/162; G06F 3/165; H04R 27/00; H04R 3/12; H04R 2420/07; H04B 5/79; G08C 23/04; H04S 7/30
USPC ........................................................... 381/80
See application file for complete search history.

(56) References Cited

U.S. PATENT DOCUMENTS

| | | | | |
|---|---|---|---|---|
| 11,968,504 B1 | | 4/2024 | Epstein et al. | |
| 2017/0019735 A1 | | 1/2017 | Song | |
| 2019/0124447 A1 | * | 4/2019 | Vincent | H04R 3/12 |
| 2024/0111484 A1 | * | 4/2024 | Peace | G06F 3/0482 |

OTHER PUBLICATIONS

Italian Search Report of Italian Application No. 202400012727, dated Dec. 11, 2024, 7 pages.

* cited by examiner

*Primary Examiner* — Paul Kim
(74) *Attorney, Agent, or Firm* — Chrisman Gallo Tochtrop LLC

(57) ABSTRACT

An audio system that includes equipment having a plurality of devices for sound amplification and diffusion, each of which includes a first control unit set up for adjusting the diffusion of the sound on the basis of one or more adjustment parameters; a memory unit associated with the first control unit configured for recording the adjustment parameters; and a first communication unit designed for a wireless communication subject to spatial constraints, and configured for recording data on the memory unit. The audio system includes a second communication unit, included in a portable device and designed for a wireless communication subject to spatial constraints and configured to allow the transfer to the first communication unit of adjustment parameters. The second communication unit is associated with a second control unit configured to allow the user to set the adjustment parameters in each of the devices following a predetermined sequence.

15 Claims, 4 Drawing Sheets

AUDIO SYSTEM

This invention relates to an improved audio system, especially intended for use in a professional context.

More in detail, the invention relates to an audio system which includes a system for sound amplification and diffusion provided with improved calibration means.

It is known that the professional systems for sound amplification and diffusion, hereinafter referred to simply as professional audio systems, for example those intended to be used at musical events, must be configured in such a way as to adapt the sound flow projected by them to the physical space in which they are located, to the distribution of the audience and to the architecture of the system itself.

Currently, the configuration of the system is performed by setting up each diffuser with the suitable audio adjustment parameters, acting on suitable switches and buttons of a panel or "quadrant" located on one side of the device, for example the back, at the sockets and inputs.

The prior art solution has several drawbacks, which are particularly acute if the system is used for musical performances on stage and in similar professional contexts.

When the system is mounted on a stage, the diffusers and the other devices are positioned in specific points on the floor of the stage or suspended at various heights. For example, some diffusers may be positioned in several suspended rows or in any case mounted at a significant height, at different points of the stage. This configuration in which the diffusers are positioned vertically in line is called "line array" in the jargon of the trade. When it is necessary to update the settings of these suspended diffusers, once power is supplied to the system and the panels are switched on, the technician in charge must use a ladder to reach those diffusers. This operation is very inconvenient. Moreover, since the stages are very often mounted outdoors and in uncovered environments or covered only with a roof, the panels for setting up the audio parameters may be exposed to adverse weather conditions, with the consequent risk of malfunctions.

Some high-end systems are provided with a centralised control system to which the diffusers are wired. This alternative overcomes in part the limits outlined above but requires greater economic expenditure, more complex wiring and can only be effectively used by technically trained personnel.

The technical purpose which forms the basis of the invention is to provide an audio system which overcomes the limitations of the prior art.

This specified technical purpose is achieved by the invention according to the appended claims.

Further features and advantages of this invention are more apparent in the non-limiting description of a preferred but non-exclusive embodiment of an improved audio system, as illustrated in the accompanying drawings, in which.

Figure 1:
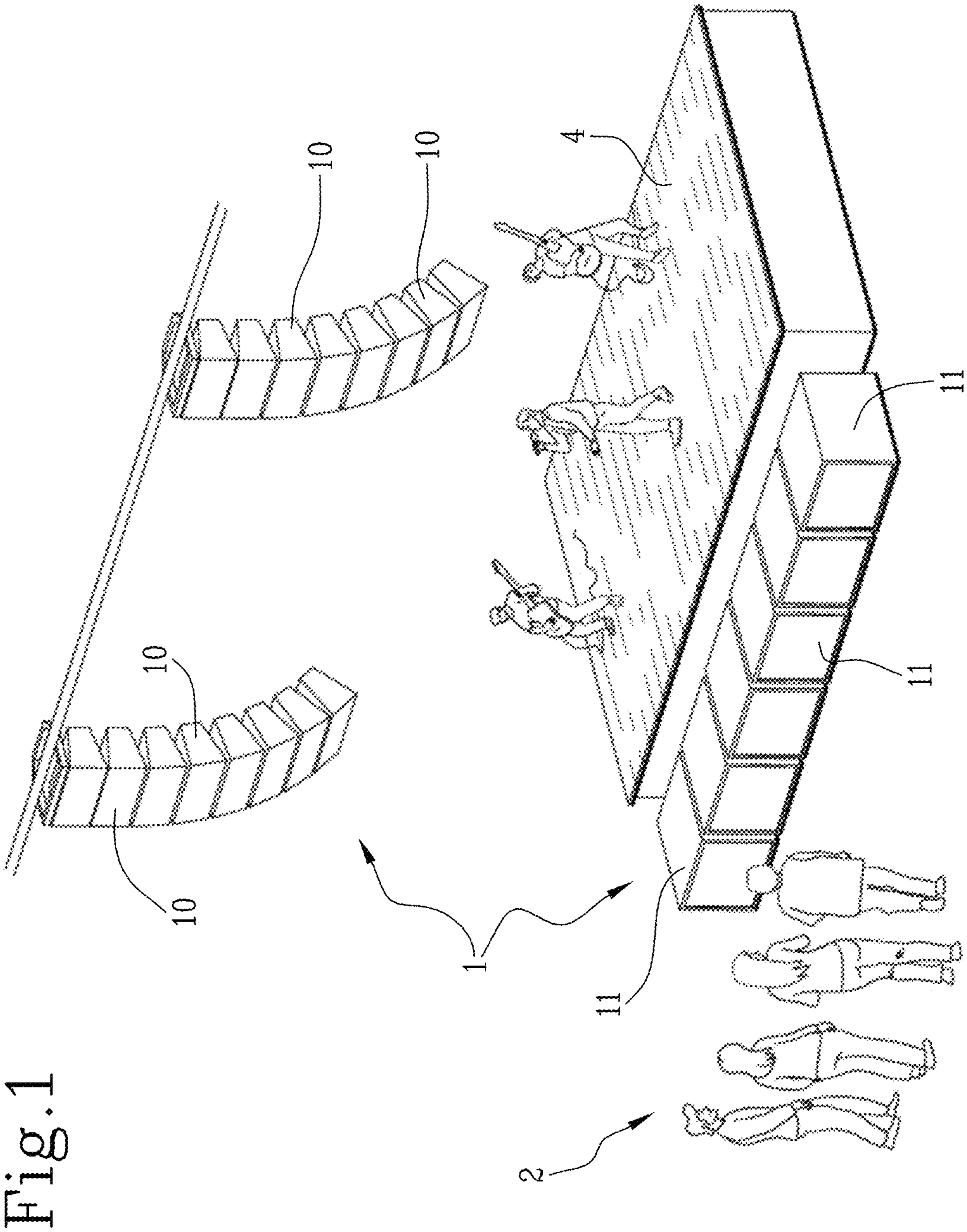
FIG. 1 is an example representation which shows an audio system such as that according to the invention used during a concert.
Figure 2:
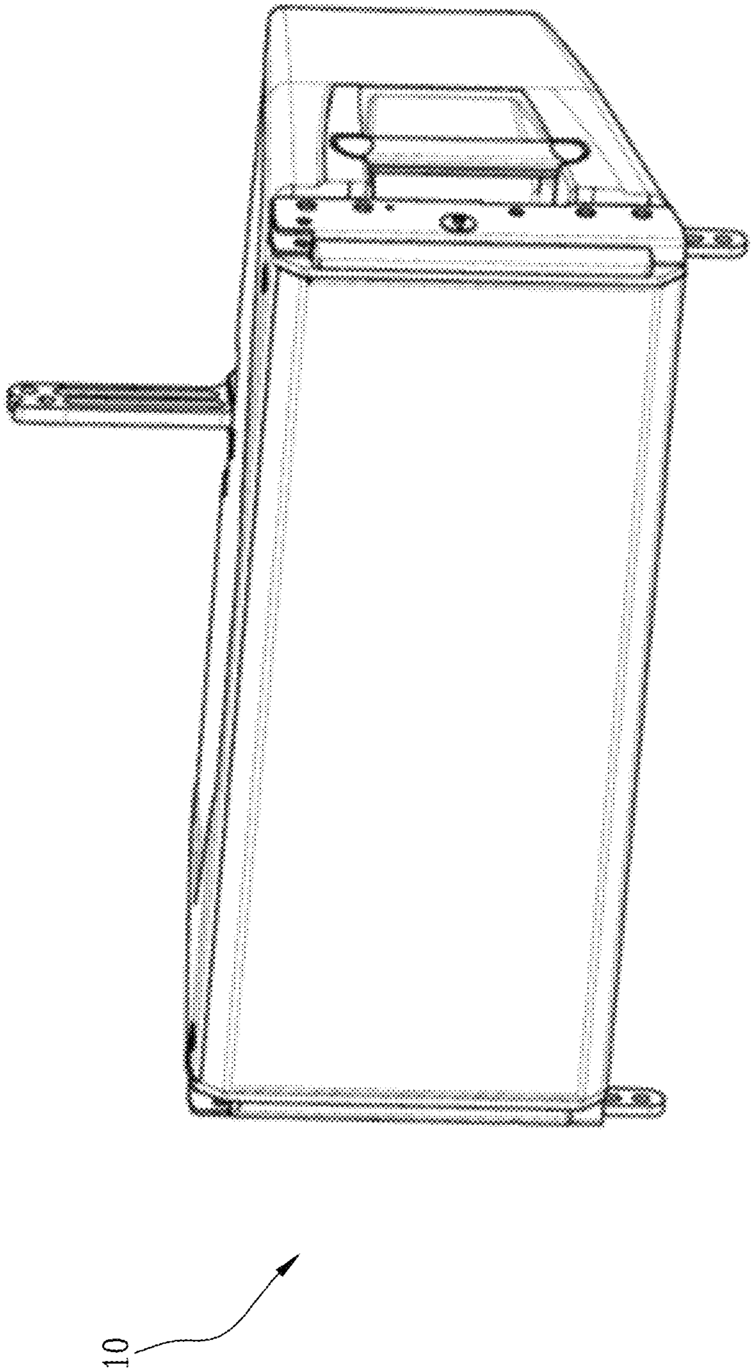
FIG. 2 is an axonometric view of a diffusion device

With reference to the accompanying drawings, the numeral 1 denotes in its entirety the audio system according to the proposed system.

More in detail, the audio system 1 according to the invention is preferably of a professional type and is provided with mixers, amplifiers, microphones, diffusers, etc.

The proposed system 1 includes one or more amplification and diffusion devices 10, 11, preferably consisting of diffusers 10, 11 (or "boxes", as they are also called), including boxes 10 arranged in line vertically with mutually variable orientations, that is to say, so-called "line arrays" and "subwoofers" 11, which may be arranged horizontally in line. Each of these audio devices 10, 11 includes a first control unit set up for adjusting the diffusion of sound emitted by the device 10, 11 on the basis of one or more adjustment parameters. Hereinafter, unless specified otherwise, the term 'audio device' means the device for sound amplification and diffusion 10, 11 according to the invention.

In detail, the adjustment parameters preferably comprise: the signal level, the frequency response, the phase and the delay, the dynamic behaviour with variations in the input signal level.

Each audio device 10, 11 also includes at least one memory unit associated with the above-mentioned control unit and configured for recording the adjustment parameters.

According to an important aspect of the invention, each audio device 10, 11 include a first communication unit designed for a wireless communication subject to spatial constraints and configured for recording data on the above-mentioned memory unit.

The expression 'wireless communication subject to spatial constraints' means a 'wireless' data transmission method that is limited in the propagation into the surrounding environment by spatial restrictions. For example, the invention may use a communication technology subject to constraints relative to distance, in particular maximum range, such as NFC technology or other near-field communication technologies. It should be noted that NFC technology has the advantage over Bluetooth technology that it can be used even without a power supply, as well as allowing a more secure communication.

Another example is that of a communication subject to constraints relating to orientation, such as that of the infrared technology.

The audio system according to the invention also comprises a second communication unit, which is included in a portable device, such as, for example, a "smartphone".

The second communication unit, like the first unit, is also designed for a wireless communication subject to spatial constraints.

The second unit is also configured to allow the transfer to said first communication unit of one or more adjustment parameters.

Further, the second communication unit is associated with a second control unit which may be included in the above-mentioned portable device. The second communication unit is configured to allow the user to set the adjustment parameters in each diffusion device following a predetermined sequence.

In general, at least one between the first and the second communication units (preferably, both) is designed to operate even in the absence of an electricity supply.

The first communication unit may incorporate or be joined to the above-mentioned memory unit. The second communication unit preferably comprises or consists of an NFC reader and acts as a so-called "initiator". The first and second communications units may consist of or include a microcontroller or a microprocessor.

The first control unit, which preferably consists of a digital signal processor, may comprise a reading module configured to read or receive as input the parameters recorded in the memory unit and may also comprise an adjustment module designed to adjust the operation of the loudspeakers of the audio device 10, 11.

According to an embodiment of the invention, the adjustment parameters are a function of the arrangement of the audio devices 10, 11 and of the audience 2. In detail, the second control unit may comprise a translation module configured for generating the adjustment parameters as a function of arrangement parameters of the audience 2 and arrangement parameters of the audio devices 10, 11. More specifically, said parameters for arranging the audience 2 may be relative to the distance between the audio devices 10, 11 and the audience 2 or between the stage 4 and the audience 2 and the parameters of the audio devices 10, 11 may be relative to the arrangement of the audio devices 10, 11, for example the height of the line arrays 10 from the ground or from the stage 4 or, for example, the position of the subwoofers 11.

It should be noted that, in the present description, the control units are presented as being subdivided into separate functional modules solely for the purpose of describing the functions clearly and completely. The various modules can correspond to hardware units and/or software routines forming part of the units.

The portable device may comprise a user interface 5, associated with the second communication unit, which allows the user to select or enter parameters for arrangement of the audience 2 and parameters for arrangement of the audio devices 10, 11.

The user interface 5 may comprise or be associated with a touchscreen and therefore be a graphical interface 5 which reproduces indices, icons, fields and commands suitable for selecting the adjustment parameters.

Figure 4:
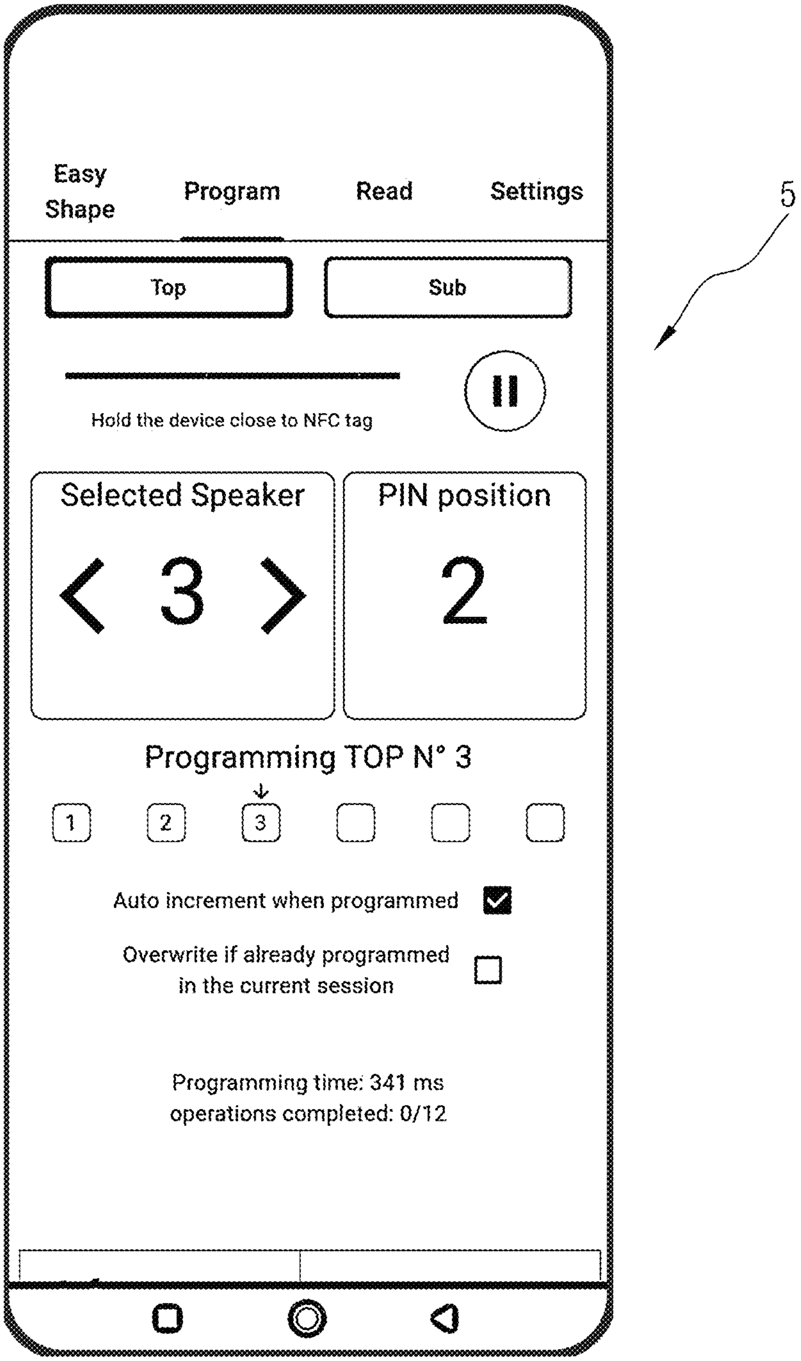
FIG. 4 shows an example of a graphical interface of a program for setting up the adjustment parameters of the system.

The portable device may include the above-mentioned second control unit, which may be a microprocessor, a microcontroller or the like, wherein a setting up program is executed which allows the user a guided selection for setting up the adjustment parameters. FIG. 4 shows an example of the graphical interface 5 according to the invention, as may appear on the screen of a smartphone.

According to a variant of the invention, the proposed system also comprises a central control unit which is configured for transmitting to the portable device signals which are a function of the adjustment parameters and are designed to allow the setting up of the adjustment parameters in each audio device.

In this case, the above-mentioned translation module is not used, since the second control unit is configured to use the second communication unit for transmitting to the first communication unit of each audio device the respective adjustment parameters received from the central unit, in such a way that they are recorded in the respective memory units.

This embodiment is particularly, even if not exclusively, useful in the case of small systems with few audio devices 10, 11, possibly used in small rooms, for which it is not necessary to take into account the arrangement of the audience 2 and the audio devices 10, 11 in order to determine the adjustment parameters of the various devices 10, 11.

It should be noted that the two embodiments described above are not necessarily alternatives and it is therefore possible that the system allows both the setting up of the adjustment parameters in the individual audio devices 10, 11 by converting the arrangement parameters allowed by the second control unit and the setting up of the adjustment parameters by transferring them from the central unit to the portable device and from there to the individual audio devices 10, 11. It is also possible that the system uses, on the other hand, only one of the two modes.

A possible operation of the invention is as follows.

Figure 3:
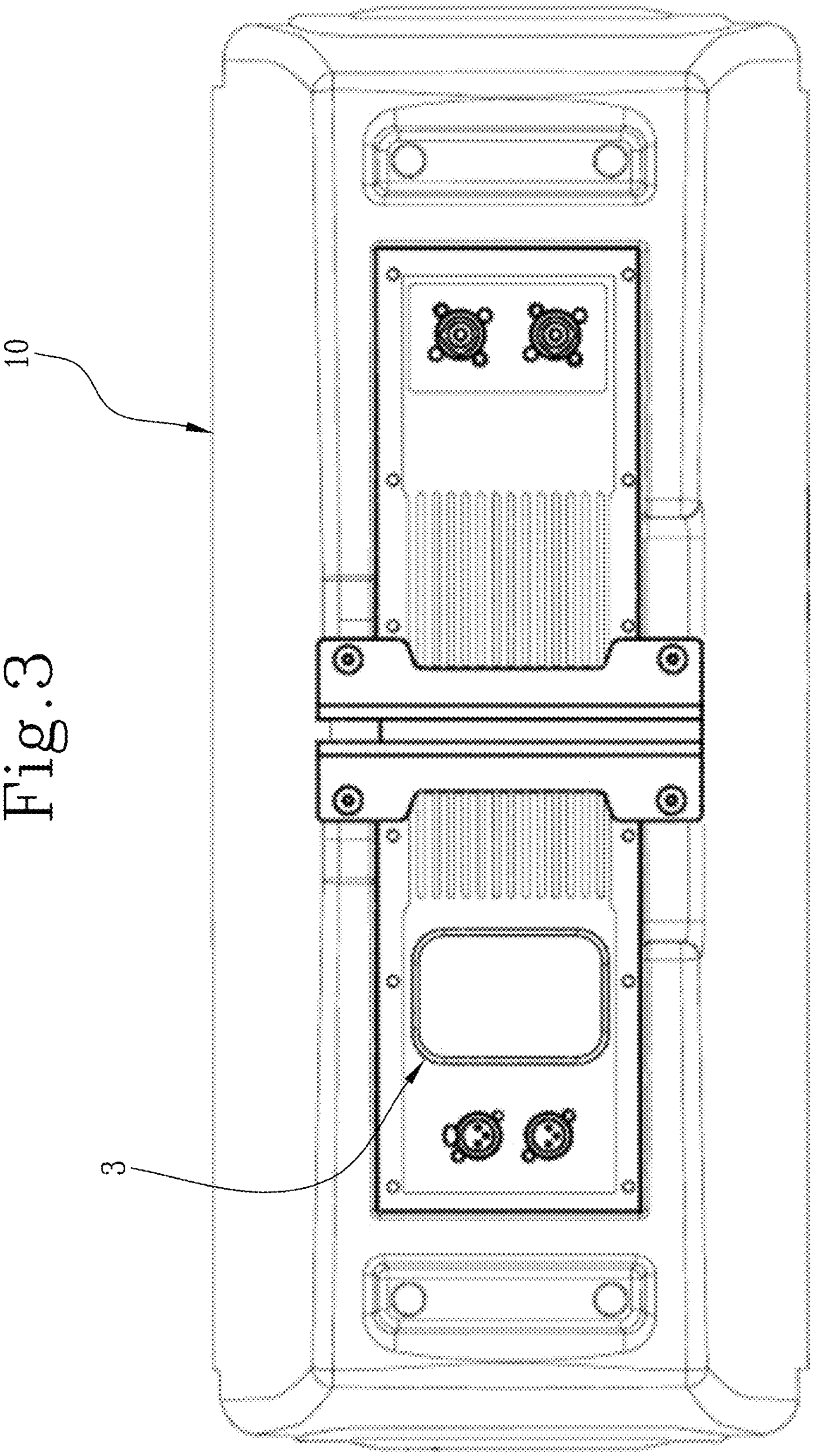
FIG. 3 is a front view of the back of the device of FIG. 2.

Before the audio devices included in the system 1 are positioned on the stage 4 or other spaces and after selecting or inserting the parameters for arranging the audience 2 and the audio devices 10, 11 on the relative smartphone or similar device, the user moves the smartphone towards each audio device 10, 11 close to the zone 3 in which the first communication unit is located. This zone 3 may be, for example, marked by a symbol and be located in the back of the audio device 10, 11, close to the input connectors (see the example of FIG. 3).

The above-mentioned translation module, which may be included in the above-mentioned setting up program, produces the adjustment parameters which are automatically copied in the memory unit of each audio device 10, 11 or of its first communication unit. This activity is the one also referred to in this description as "setting up" or "programming" of the diffusers. Alternatively, as already explained, the portable devices can receive the adjustment parameters from the central unit and then transfer them to the audio devices 10, 11.

Advantageously, according to the invention, it is not necessary to connect the audio devices 10, 11 to a source of electrical current to be able to set up the adjustment parameters and program the system correctly. In effect, the recording of the parameters in the memory unit will occur with the diffuser 1 switched off.

Moreover, by using NFC technology, which has a very short radius of action, the invention forces the user to pass by each audio device 10, 11 to perform its programming which is synergic with the function of incremental setting of the parameters which is described below. The same applies for the use of infrared technology, since the user is forced to arrange the portable device with a certain orientation with respect to the infrared detector of each audio device 10, 11.

Since the adjustment parameters can be different for each audio device 10, 11, in particular for each element of a line array, the setting up program indicates to the user the sequence with which the programming of the audio devices 10, 11 must be performed and checks that this sequence is complied with and that all the audio devices 10, 11 which must be programmed are programmed.

More in detail, the above-mentioned second control unit may comprise a sequence module, which may form part of the above-mentioned program, configured to indicate to the user, preferably by means of said interface 5, information designed to allow the user to enter the adjustment parameters in each audio device 10, 11 following a predetermined sequence.

For example, this information may relate to the same sequence which the user must follow in the setting up or even only which must be the next audio device 10, 11 which must be set up, which is updated each time the audio device 10, 11 provided has been set up, until all the audio devices 10, 11 have been set up.

Moreover, the processing unit may also include a check module, which may form part of the above-mentioned program, configured for checking that the setting up parameters are recorded in the first communication unit of the respective diffusion device 1 according to the predetermined sequence, thereby preventing errors, repetitions and omissions.

For example, this control is allowed by an identifier recorded in the memory unit included in each audio device 10, 11 or in its first communication unit, which may be a serial number or an equivalent data.

Further, the second control unit may include a signaling module configured to provide to the user, by means of said interface, visual and/or acoustic indications as a function of the correct or incorrect execution of the predetermined sequence. In this way, the user is informed about the fact that the sequence has or has not been complied with and/or whether or not one or more audio devices 10, 11 have been set up.

After the setting up of the adjustment parameters of all the audio devices 10, 11 has been completed, the audio devices 10, 11 can be wired and located in their destination position, even at significant heights from the ground.

Since the invention allows the adjustment parameters to be set up automatically, the audio devices 10, 11 of the proposed system 1 do not need a quadrant. For this reason, advantageously, the control unit, the memory unit and the first communication unit may be enclosed in a watertight container, which may coincide with the casing of the respective audio device 10, 11.

In practice, the invention makes it possible to obtain a setting up of the audio devices 10, 11 of an audio system 1 having a versatility and an effectiveness comparable to that of the high-end systems provided with a centralised control system, but with much lower costs and by means of a guided procedure which does not require the presence of expert users, which are, on the other hand, necessary for systems with a centralised system.

The invention claimed is:

1. An audio system comprising a system for sound amplification and diffusion (1) in turn comprising a plurality of devices (10, 11) for sound amplification and diffusion, each of which includes:

- a first control unit set up for adjusting the diffusion of sound on the basis of one or more adjustment parameters;
- a memory unit associated with said first control unit configured for recording said adjustment parameters; and
- a first communication unit designed for wireless communication subject to spatial constraints, and configured for recording data on the memory unit;
- wherein said audio system also comprises a second communication unit, included in a portable device and designed for a wireless communication subject to spatial constraints and configured to allow the transfer to said first communication unit of one or more adjustment parameters;
- wherein the second communication unit is associated with a second control unit configured to allow the user to set the adjustment parameters in each of said devices (10, 11) following a predetermined sequence.

2. The system according to claim 1, wherein the second control unit comprises a translation module configured for generating the adjustment parameters as a function of arrangement parameters of the audience (3) and arrangement parameters of the audio devices (10, 11).

3. The system according to claim 1, wherein the second communication unit is associated with a user interface (5) designed to allow the user to select or enter said arrangement parameters.

4. The system according to claim 3, wherein the second control unit includes a signaling module configured to provide to the user, by means of said interface (5), visual and/or acoustic indications as a function of the correct or incorrect execution of the predetermined sequence.

5. The system according to claim 1, comprising a central control unit configured for transmitting signals to the portable device as a function of the adjustment parameters designed to allow the setting of the adjustment parameters in each diffusion device.

6. The system according to claim 1, wherein the second control unit includes a checking module configured for checking that the adjustment parameters are recorded in the first communication unit of the respective diffusion device according to said predetermined sequence.

7. The system according to claim 1, wherein at least one between the first and the second communication unit is designed to operate even in the absence of an electricity supply.

8. The system according to claim 1, wherein the first and the second communication units are designed for a wireless communication subject to constraints relative to the proximity.

9. The system according to claim 1, wherein the first and second communication units are designed for communication using NFC technology.

10. The system according to claim 1, wherein the first and the second communication units are designed for a wireless communication subject to constraints relative to the orientation.

11. The system according to claim 10, wherein the first and the second communication units are designed for a communication using infrared technology.

12. The system according to claim 1, wherein the above-mentioned adjustment parameters are one or more of the following: signal level, frequency response, phase and delay, dynamic behaviour with variations in the input signal level.

13. The system according to claim 1, wherein said devices (10, 11) are equal to each other.

14. The system according to claim 1, wherein at least some of the above-mentioned devices (10) are positioned vertically in line with variable reciprocal orientations.

15. The system according to claim 1, wherein at least some of the above-mentioned devices (11) are subwoofers arranged horizontally in line.

* * * * *